United States Patent
Zhong

(10) Patent No.: US 10,797,616 B2
(45) Date of Patent: Oct. 6, 2020

(54) POWER ELECTRONIC CONVERTERS THAT TAKE PART IN THE GRID REGULATION WITHOUT AFFECTING THE DC-PORT OPERATION

(71) Applicant: Qingchang Zhong, Willowbrook, IL (US)

(72) Inventor: Qingchang Zhong, Willowbrook, IL (US)

(*) Notice: Subject to any disclaimer, the term of this patent is extended or adjusted under 35 U.S.C. 154(b) by 0 days.

(21) Appl. No.: 16/147,867

(22) Filed: Sep. 30, 2018

(65) Prior Publication Data
US 2019/0131888 A1    May 2, 2019

(30) Foreign Application Priority Data
Oct. 26, 2017  (GB) .................................. 1717573.8

(51) Int. Cl.
| | | |
|---|---|---|
| H02M 7/797 | (2006.01) | |
| H02M 1/14 | (2006.01) | |
| H02M 1/44 | (2007.01) | |
| H02M 1/08 | (2006.01) | |
| H02M 7/5387 | (2007.01) | |

(52) U.S. Cl.
CPC ............. *H02M 7/797* (2013.01); *H02M 1/08* (2013.01); *H02M 1/143* (2013.01); *H02M 1/44* (2013.01); *H02M 7/53871* (2013.01)

(58) Field of Classification Search
CPC ........ H02M 7/797; H02M 1/08; H02M 1/143; H02M 1/44; H02M 7/53871
See application file for complete search history.

(56) References Cited

FOREIGN PATENT DOCUMENTS
| | | |
|---|---|---|
| GB | 2483879 | 3/2012 |
| GB | 2542194 | 3/2017 |

*Primary Examiner* — Adolf D Berhane

(57) ABSTRACT

This invention discloses a DC/AC power electronic converter system that takes part in the regulation of grid voltage and frequency without affecting the normal operation of the DC port, which is either connected to a load when operated as a rectifier or to a DC source when operated as an inverter. In addition to the normal DC and AC ports of a DC/AC converter, the disclosed converter has an extra port for the connection of storage units. Its controller consists of a storage voltage controller to make sure that the storage voltage $V_{DC}$ does not exceed the specified range, a power controller to interact with the grid, and an inner-loop controller that takes the grid voltage $v_g$ and/or the grid current $i$ as the feedback. This turns the disclosed converter into a continuous reserve. It enables rectifier-fed loads to provide continuous demand response and inverter-fed sources to provide continuous frequency response. Possible applications include any field that adopts a DC/AC converter, e.g. in wind power, solar power, storage systems, home appliances, IT equipment, motor drives, electric vehicles, and LED lights.

8 Claims, 6 Drawing Sheets

POWER ELECTRONIC CONVERTERS THAT TAKE PART IN THE GRID REGULATION WITHOUT AFFECTING THE DC-PORT OPERATION

CROSS-REFERENCE TO RELATED APPLICATIONS

This nonprovisional patent application claims the benefit of and priority under 35 U.S. Code 119 (b) to U.K. Patent Application No. GB1717573.8 filed on Oct. 26, 2017, entitled "Power Electronic Converters that Take Part in the Grid Regulation without Affecting the DC-port Operation", the contents of which are all hereby incorporated by reference herein in its entirety.

TECHNICAL FIELD

This invention is concerned with a DC/AC power electronic converter system that takes part in the regulation of power system voltage and frequency without affecting the normal operation of the DC port, which is either connected to a load when operated as a rectifier or to a DC source when operated as an inverter. This turns the disclosed converter into a continuous reserve. It enables rectifier-fed loads to provide continuous demand response and inverter-fed sources to provide continuous frequency response. Possible applications include any field that adopts a DC/AC converter, e.g., in wind power, solar power, storage systems, home appliances, IT equipment, motor drives, electric vehicles, and LED lights. The presentation of this disclosure is made with the positive current direction taken as the direction when the AC current is flowing into the converter, i.e, when it is operated as a rectifier. The disclosed invention can be applied to both rectifiers and inverters, with or without any change.

BACKGROUND

Due to the rapid growth of global economy, the demand for electricity is constantly increasing, leading to energy crisis and environmental issues. To deal with such problems, more and more distributed generators (DGs), such as wind and solar farms, are connected to the grid. However, the intermittency of DGs have brought great challenges to power system stability. One option to deal with this problem is to enable DGs to take part in the voltage and frequency regulation of the power system, which can be done by operating the power electronic inverters in these systems to behave like virtual synchronous machines (VSM). At the same time, many different types of loads are being connected to the power grid through power electronic rectifiers. Motors, lighting and internet devices that consume more than 80% electricity are expected to be equipped with rectifiers at the front end for various reasons. At the moment, most of these loads are not able to take part in the regulation of the grid, although there are great benefits to do so. Demand-side management (DSM) has been an active research area for several years, with the objective of improving the system stability from the demand side. Most of the DSM programs focus on the interaction between a utility and its customers. One such approach, called the direct load control, can remotely control the energy consumption of certain appliances. There are also approaches based on the game theory for users to actively respond to the price information and take part in the power system regulation. However, these DSM methods rely on a digital communication infrastructure among utilities and users, and often require human beings at the demand side to take action. Moreover, the demand-side regulation available nowadays is done on the on/off basis. It would be much better if the loads could take part in the grid regulation in a continuous way, like generators.

It is well known that synchronous machines (SM) can synchronize with each other and take part in the system regulation without communication. It has been shown that the synchronization mechanism of SM can continue to be adopted for future power systems via operating power electronic converters to behave as VSM. Based on this, it is also possible to operate rectifiers as virtual synchronous motors. Robust droop control is such a technology for converters to take part in the grid regulation. It has been shown that it can be applied to converters with different types of output impedance, making it the universal droop control. However, how to take part in the grid regulation without affecting the operation of the DC port is still not clear.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

The invention discloses a DC/AC converter with a storage port to support the grid without affecting the DC-port operation, as defined in claim 1. Optional features are as defined in the dependent claims. It can be a single-phase power electronic converter or a poly-phase power electronic converter.

BRIEF DESCRIPTION OF THE DRAWINGS

The accompanying figures further illustrate the disclosed embodiments and, together with the detailed description of the disclosed embodiments, serve to explain the principles of the present invention.

DETAILED DESCRIPTION

Figure 1:
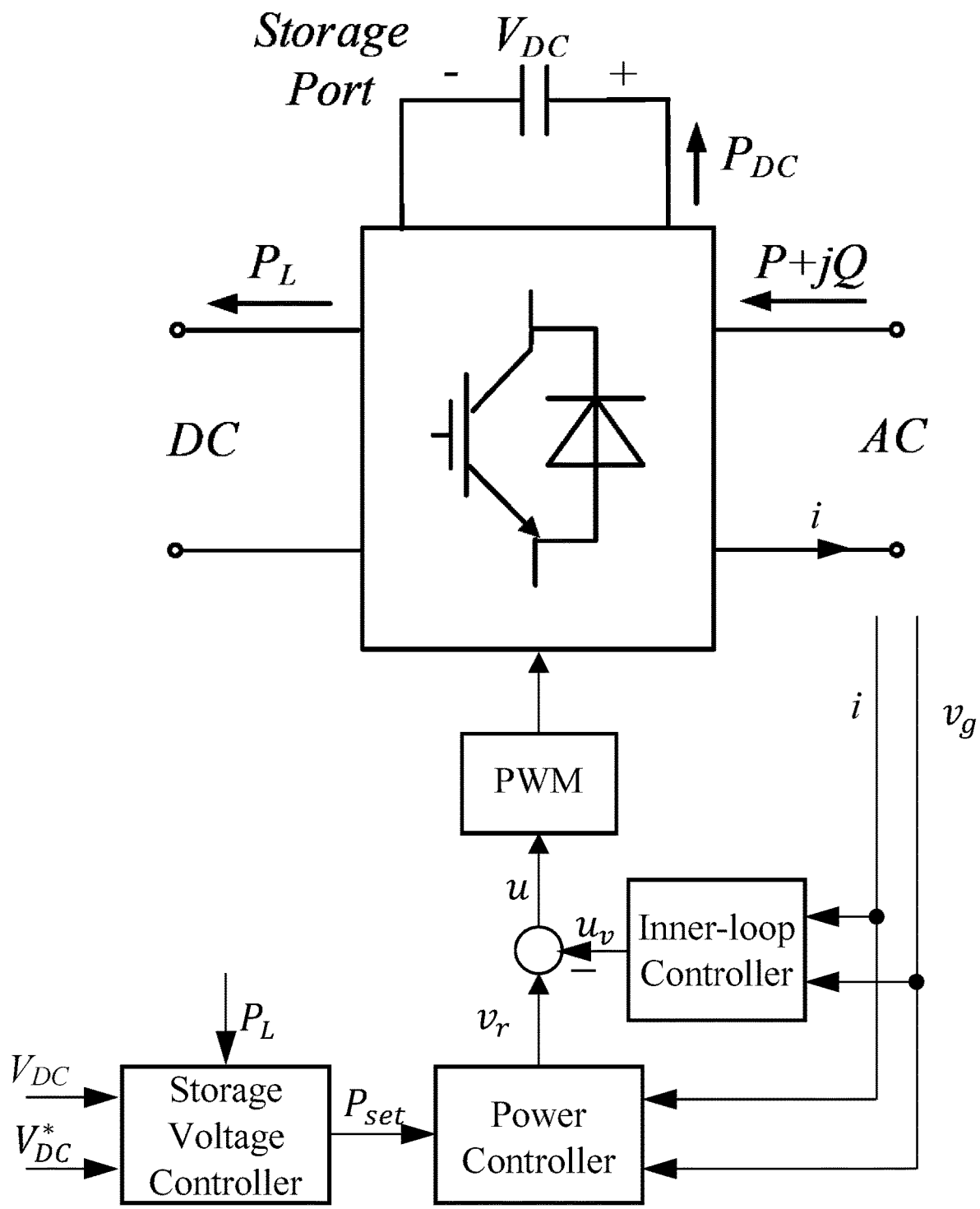
FIG. 1 illustrates the disclosed invention consisting of a three-port converter with an AC port, a DC port and a storage port and its controller.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A Converter with Three Ports

A conventional DC/AC power converter has two ports: a DC port and an AC port. Under the droop control, the power exchanged with the grid at the AC port will change according to the voltage and frequency deviations of the power grid. However, the DC-port power often has limited flexibility. For example, the power consumption of the load in the case of a rectifier is determined by the load and the power generated by the source in the case of a renewable generator with an inverter is often determined by the condition and the maximum-power point tracking (MPPT). Hence, an energy storage unit is needed to meet the power difference. This is often provided by adding a separate storage unit into the system. However, most DC/AC converters have DC-bus capacitors to reduce the voltage ripples so that the DC-bus voltage is maintained stable. With proper design and control, these capacitors can also function as energy storage devices to provide the flexibility needed. The challenge lies in the implementation of such a function without increasing the complexity of the converter topology, in particular, the number of active switches.

This invention discloses a DC/AC converter with a storage port, as illustrated in FIG. 1, to support the grid without affecting the DC-port operation. It can be a single-phase power electronic converter or a poly-phase power electronic converter. In this disclosure, a single-phase converter is taken as an example. It has three ports: one AC port, one DC port and one storage port. The AC port is connected to the AC source, e.g., the grid, and the DC port is connected to the load when the converter is operated as a rectifier or the DC source when it is operated as an inverter. The storage port can be connected to a capacitor bank, batteries or other appropriate storage units. $V_{DC}$ is the storage voltage, $P_{DC}$ is the real power exchanged with the storage (the capacitor) and $P_L$ is the real power consumed by the load connected to the DC port. P and Q are the real and reactive power drawn from the grid. Note that in FIG. 1 the power flow of the system can be bidirectional so the disclosed invention can be adopted for both rectifiers and inverters. Because of the additional storage port, the storage voltage $V_{DC}$ is allowed to vary in a wide range while the voltage of the DC port remains constant to meet the needs of the load. Ignoring the losses, the power $P_{DC}$ exchanged with the storage capacitor is equal to the power P drawn by the converter minus the power $P_L$ at the DC port, that is $$P_{DC}=P-P_L \tag{1}$$

Normally, there is $P=P_L$ in the steady state so $P_{DC}=0$. However, in this disclosure, the storage capacitor acts as an energy storage unit to meet the power difference so normally there is $P_{DC} \neq 0$. This corresponds to a varying storage voltage by design. In order to ensure the proper operation of the three-port converter, the range of the storage voltage can be designed according to the voltage rating of the circuit components and the amount of the grid support provided by the converter.

There are some simple topologies with three ports, e.g., the θ-converter (UK patent GB1516168.0 pending) and the Beijing converter, which have the same number of switches as the conventional bridge converters to serve the purpose. In this invention, the θ-converter is taken as an example to illustrate the concept of converters that can take part in the grid regulation without affecting the DC-port operation. Other topologies can be adopted as well.

The θ-converter was originally invented to reduce the usage of bulky electrolytic capacitors needed to buffer the ripple energy that exists in most single-phase converters. Similar to the conventional bridge converters, a θ-converter has two legs with four switches. However, the two legs are independently controlled, which turns the converter into one with three ports instead of two ports. The voltage of one port can be maintained constant so it is the DC port while the conventional DC-bus voltage can be allowed to vary within a wide range so it is the storage port. Because of this, the DC-bus capacitor also handles the power difference between the DC and AC ports, which makes it possible for the converter to take part in the voltage and frequency regulation of the power grid as well, in addition to handling the ripples that exist in power electronic converters.

The disclosed three-port DC/AC converter is equipped with the controller shown in FIG. 1. It consists of a storage voltage controller to make sure that the storage voltage $V_{DC}$ does not exceed the specified range, a power controller to interact with the grid, and an inner-loop controller that takes the grid voltage $v_g$ and/or the grid current $i$ as the feedback. The inner-loop controller is not always necessary. Whether it is needed or not depends on the converter topology and the control design.

The control signal $u$ is formed by subtracting the output $u_v$ of the inner-loop controller from the output $v_r$ of the power controller, i.e., $$u = v_r - u_v,$$

which is then converted into pulse-width-modulated (PWM) signals through the PWM block to drive the switches.

Storage Voltage Controller to Generate the Real Power Reference $P_{set}$

Figure 2:
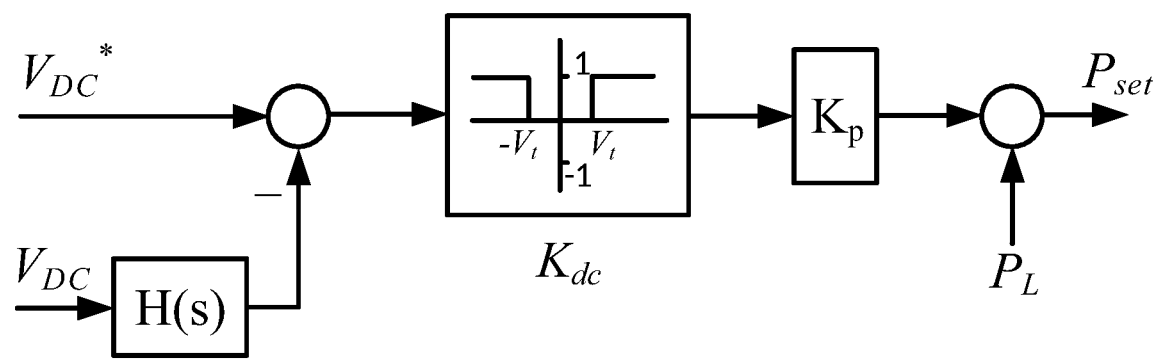
FIG. 2 shows the storage voltage controller to generate the real power reference.

The storage voltage is allowed to vary but needs to be maintained within a specified range. FIG. 2 illustrates an example storage voltage controller to achieve this purpose. It generates the real power reference $P_{set}$ for the power controller that regulates the power exchanged with the grid. The generated real power reference $P_{set}$ consists of two parts: the power $P_L$ on the DC port and the power needed to regulate $V_{DC}$. Because $V_{DC}$ often contains ripples, a low-pass filter H(s), e.g., a hold filter, can be adopted to extract the average value of $V_{DC}$. In the sequel, the notation $V_{DC}$ often means the average value of $V_{DC}$ instead of the instantaneous value. When $V_{DC}$ is above the specified range, no more power should be stored into the storage capacitor, which means $P_{set}$ should be reduced; when $V_{DC}$ is below the specified range, no more power should be drawn from the storage capacitor, which means $P_{set}$ should be increased; when $V_{DC}$ is within the specified range, no action should be taken to change $P_{set}$. This can be achieved by the control block $K_{DC}$ with appropriate functions shown in FIG. 2. For example, $K_{DC}$ can be chosen as $$K_{DC} = \begin{cases} 1 & |V_{DC} - V_{DC}^*| > V_t \\ 0 & |V_{DC} - V_{DC}^*| \leq V_t \end{cases},$$

where $V_{DC}^*$ is the rated storage voltage and $V_t$ is the threshold voltage, giving the specified voltage of [$V_{DC}^* - V_t$, $V_{DC}^* + V_t$]. When $V_{DC}$ is within the range, $K_{DC}=0$, the converter is said to work in the grid-support mode, denoted "GS". When $V_{DC}$ is out of the range, $K_{DC}=1$ and the converter is said to operate in the no-support mode, denoted "NS". This leads to the following real power reference $$P_{set} = \begin{cases} P_L + K_p(V_{DC}^* - V_{DC}) & \text{(no-support mode)}, \\ P_L & \text{(grid-support mode)}, \end{cases} \quad (2)$$

where $K_p$ is a positive proportional gain. Other features, such as hysteresis, can be introduced to smooth the transition of the modes.

Another example is to choose $K_{DC}$ as a positive constant gain or a function that has a positive value depending on other signals, such as $V_{DC}^*$ and $V_{DC}$.

Power Controller to Regulate the Power Drawn from the Grid

Figure 3:
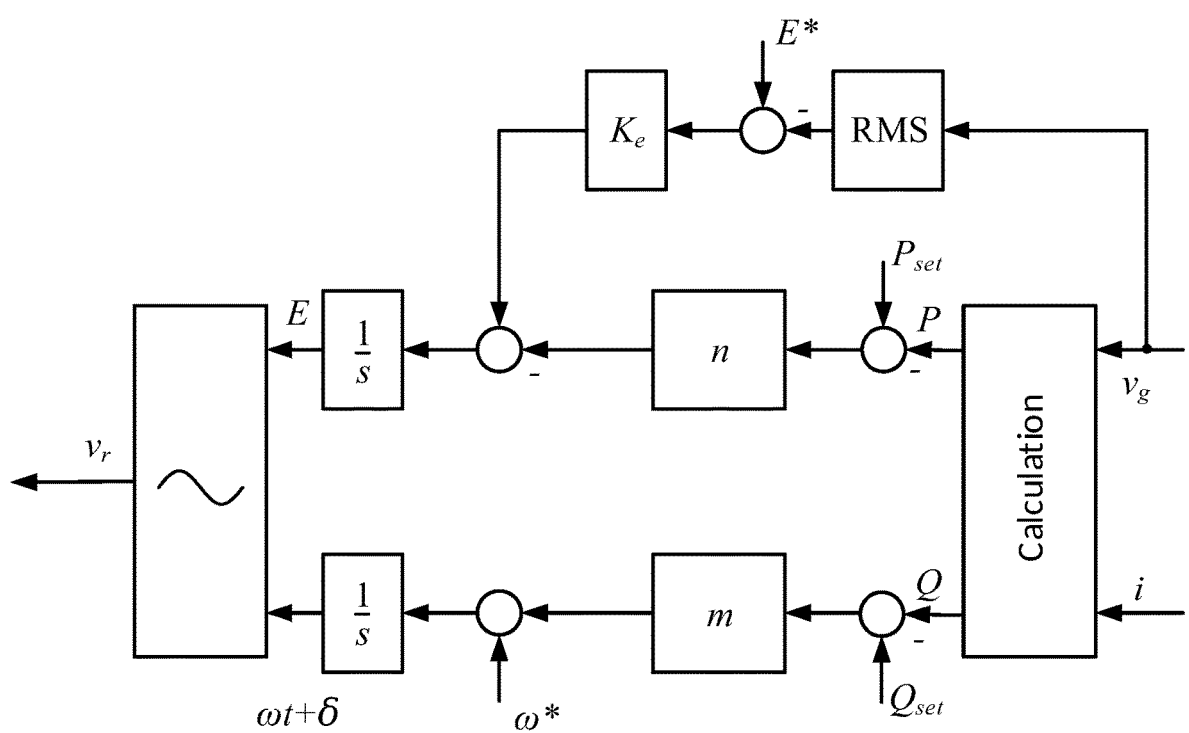
FIG. 3 presents the universal droop controller corresponding to the case when the positive direction of the current is taken as flowing into the converter.

The function of the power controller is to regulate the real power P and the reactive power Q exchanged with the grid (at the AC port) according to the grid voltage and frequency. There are different ways to achieve this. In this disclosure, the universal droop controller shown in FIG. 3 is adopted as an example. The universal droop controller was originally invented as a robust droop controller (UK patent GB2483879) to achieve accurate power sharing for parallel-operated inverters and it was then proven to be universal for converters having impedances with an angle between $$-\frac{\pi}{2} \text{ and } \frac{\pi}{2}$$

rad. It is constructed based on the following droop relationship $$E = E^* + nP, \quad (3)$$

$$\omega = \omega^* - mQ, \quad (4)$$

which is different from the conventional droop relationship of P~f and Q~E, after adding an integrator to generate the voltage set-point E and adding a local voltage feedback loop through a gain $K_e$. Here, $E^*$ is the rated RMS value of the system voltage, $\omega^*$ is the rated system frequency, and n and m are the droop coefficients. Note that the positive direction of the current is taken as flowing into the converter, which is opposite to the case for an inverter. This is reflected in (3) and (4), where the signs before P and Q are opposite to those in the inverter mode.

The universal droop controller shown in FIG. 3 allows the real power reference and the reactive power reference to be set at $P_{set}$ and $Q_{set}$, respectively. This is equivalent to setting the rated operational point of the rectifier at $P=P_{set}$ and $Q=Q_{set}$ when $V_g=E^*$ and $\omega=\omega^*$. In this disclosure, $P_{set}$ is generated by the storage voltage controller.

According to FIG. 3, the real power P drawn by the converter satisfies $$P = P_{set} + \frac{\dot{E}}{n} - \frac{K_e}{n}(E^* - V_g),$$

where $K_e$ is an amplifying gain. This allows the actual power P drawn by the converter to be different from the real power reference $P_{set}$ generated by the storage voltage controller. Hence, the converter is able to provide the essential grid support while meeting the need of the DC port and the need of regulating the storage voltage of the storage port. Normally, the real power loop is designed to be much slower than the voltage loop, which means $\dot{E}$ can be regarded as 0 when investigating the behavior of P. As a result, the real power drawn by the rectifier is $$P \approx P_{set} - \frac{K_e}{n}(E^* - V_g), \qquad (5)$$

According to FIG. 3, the reactive power satisfies $$Q = Q_{set} + \frac{\omega^* - \omega}{m}. \qquad (6)$$

In order to achieve unity power factor at the rated operational point, $Q_{set}$ can be set as 0. It can also be set at other values to provide reactive power compensation if needed, which enables the converter to provide reactive power support as well. Note that the reactive power changes according to the grid frequency deviation in the droop mode so the reactive power is not zero when the frequency is not at the rated value. If a unity power factor is desired, the Q~ω droop can be designed to be soft so that the change of the reactive power is small with respect to the change of the frequency.

The amplifying gain $K_e$ can be a constant or a function that depends on the filtered storage voltage, the rated storage voltage, and other factors.

As mentioned before, the power controller can be implemented with other approaches as well. For example, the conventional droop relationship of P~$f$ and Q~E can be implemented via swapping the inputs to the blocks n and m FIG. 3 and multiplying the output of the block m by −1.

Inner-Loop Controller

From time to time, an inner-loop controller that takes the grid voltage $v_g$ and/or the grid current $i$ as the feedback is adopted for various reasons, e.g. to improve power quality or to improve the stability of the converter. Whether the inner-loop controller is needed or not depends on the converter topology and the control design. Normally, this inner-loop controller can be a cascaded voltage-current controller, taking the voltage $v_r$ generated by the power controller as its input. It may only include the voltage controller or the current controller, depending on the converter topology and the control design. When the current controller is adopted, it acts as a virtual impedance and typically it can be a proportional gain that acts as a virtual resistance, an integrator that acts as a virtual capacitor, or the combination of both.

An Illustrative Example with the θ-converter

In this disclosure, the three-port four-switch θ-converter disclosed in UK patent application GB1516168.0 is taken as an example to illustrate the implementation of the disclosed converter to take part in the grid regulation without affecting the DC-port operation.

Brief Introduction of the θ-converter

Figure 4:
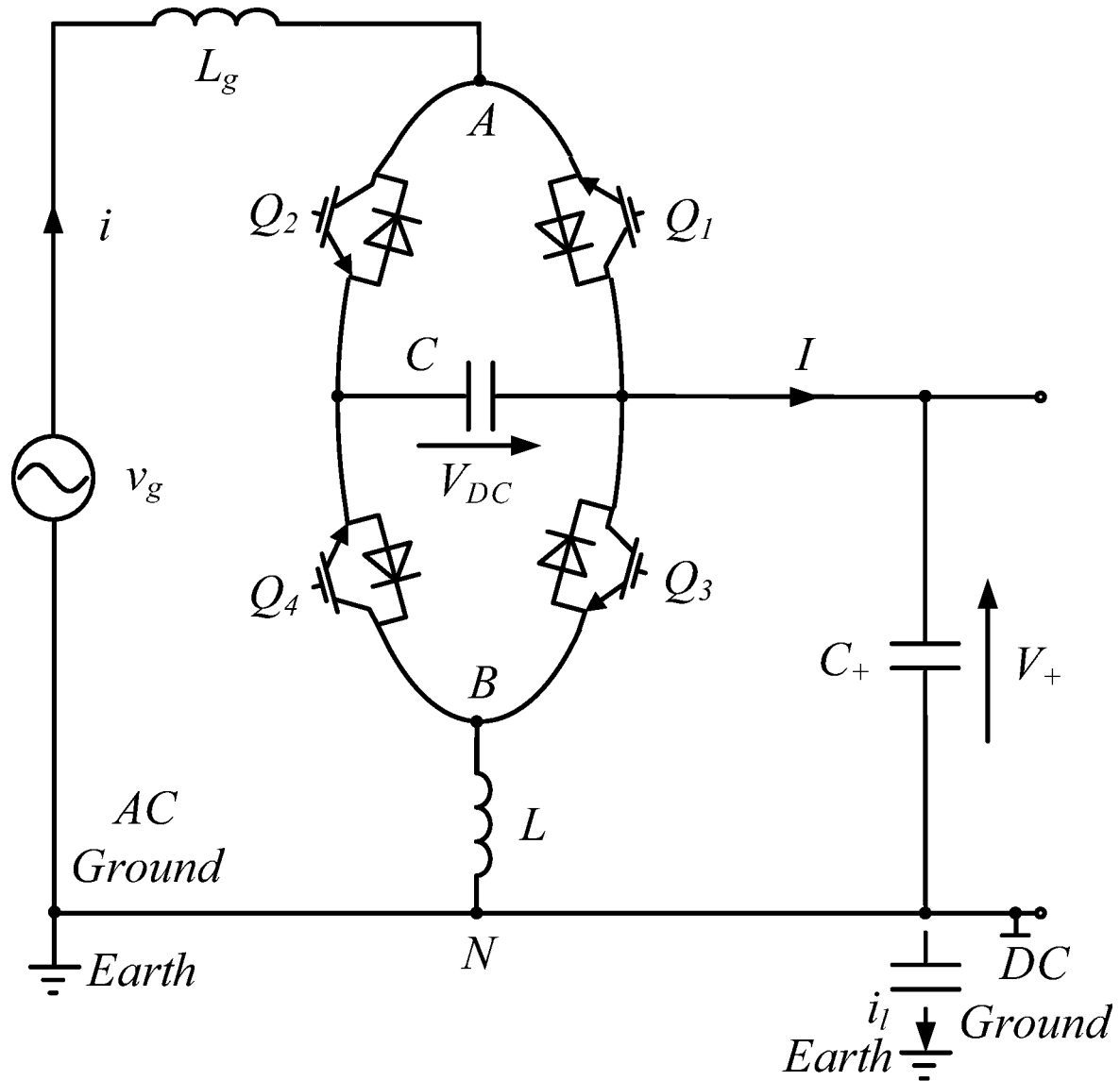
FIG. 4 shows the θ-converter adopted to illustrate the invention.

As shown in FIG. 4, the θ-converter has two legs: one conversion leg and one neutral leg. The conversion leg consists of two switches $Q_1$ and $Q_2$, one inductor $L_g$ and one storage capacitor C. It is operated as a AC/DC converter. The neutral leg consists of two switches $Q_3$ and $Q_4$, one inductor L and one capacitor $C_+$. It is operated as a DC/DC converter. Note that there are only four switches, the same as the conventional single-phase bridge converters. Unlike a conventional full-bridge converter, the load in the case of a rectifier or the source in the case of an inverter is connected to the DC port with the output voltage $V_+$ and the conventional DC-bus capacitor is treated as a storage port with the voltage $V_{CD}$ that could vary in a wide range. The neutral inductor L is added in order to enable the regulation of the voltage $V_+$. It is possible to relocate the inductor L to the DC output to reduce the current stress of the inductor L, but this does not affect the illustration of the disclosed invention. More conversion legs can be added for poly-phase applications.

A prominent feature of the θ-converter is that the two legs are independently controlled. The conversion leg is responsible for regulating the power exchanged with the grid and the neutral leg is responsible for maintaining the DC output voltage $V_+$ and diverting the ripples to the capacitor C. In this disclosure, the storage voltage is allowed to vary in an even wider range to provide grid support.

The switches $Q_1$ and $Q_2$, $Q_3$ and $Q_4$ are operated in complementary, respectively. The duty cycle of the switch $Q_4$ satisfies $$d_4 = \frac{V_+}{V_{DC}}. \qquad (7)$$

Since the switches $Q_3$ and $Q_4$ are operated in complementary, its duty cycle is $$d_3 = 1 - d_4 = 1 - \frac{V_+}{V_{DC}} \qquad (8)$$

The conversion leg is a half bridge converter. The duty cycle of the switch $Q_2$ is $$d_2 = \frac{V_+}{V_{DC}} - \frac{v_g}{V_{DC}} \qquad (9)$$

while the duty cycle of the switch $Q_1$ is $$d_1 = 1 - d_2 = 1 - \frac{V_+}{V_{DC}} + \frac{v_g}{V_{DC}}. \qquad (10)$$

As can be seen, the duty cycles of switches $Q_1$ and $Q_2$ contain a DC component $$\frac{V_+}{V_{DC}}$$

and an ac component $$\frac{v_g}{V_{DC}}.$$

The DC component $$\frac{V_+}{V_{DC}}$$

is needed to eliminate the effect brought from the output voltage $V_+$. The ac component $$\frac{v_g}{V_{DC}}$$

represents the conversion ratio between the grid voltage $v_g$ and the storage voltage $V_{DC}$.

Control of the Neutral Leg

Figure 5:
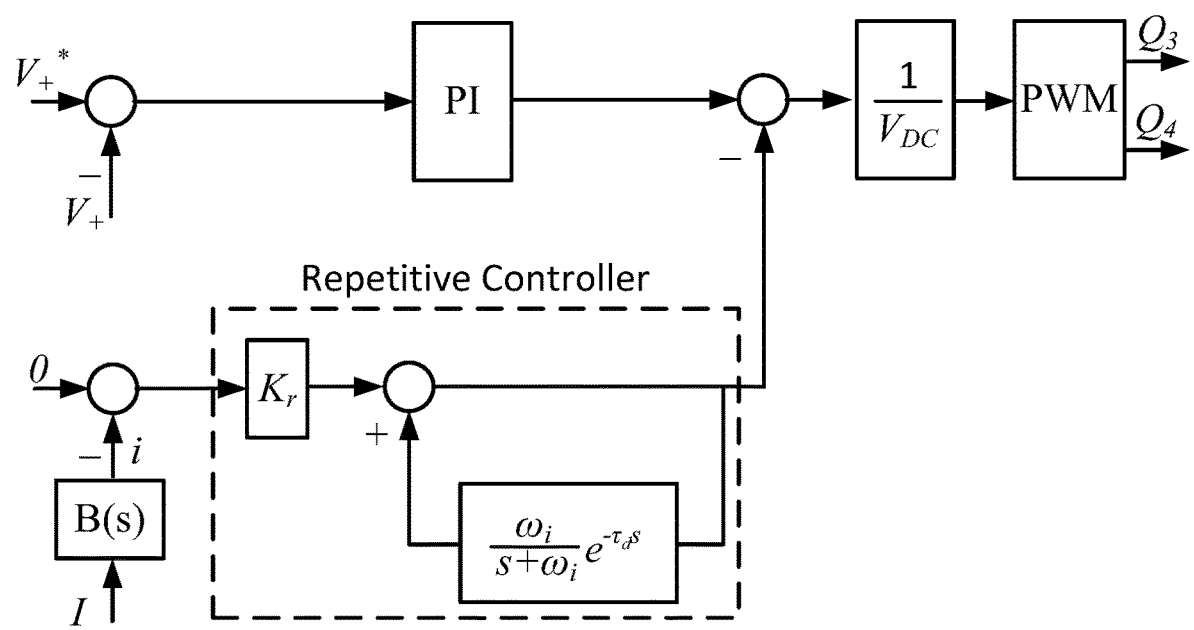
FIG. 5 shows the controller for the DC port, i.e., the neutral leg of the θ-converter.

The controller for the neutral leg is shown in FIG. 5. It adopts a PI controller to regulate the output voltage $V_+$ and a repetitive controller to remove the low-frequency component in $V_+$. A band-pass filter $$B(s) = \frac{10000s}{(s+10)(s+10000)}$$

is used to extract the low-frequency component in the output current I, which is then put through a repetitive controller $$C(s) = \frac{K_r}{1 - \frac{\omega_i}{s + \omega_i} e^{-\tau_d s}}.$$

It forces the low-frequency component in I to be zero. Therefore, the low-frequency ripples, which are mainly fundamental and second-order components, are forced not to go through the DC port. Hence, the voltage $V_+$ is maintained stable while the storage voltage is varying. If the converter is operated as an inverter, then the voltage of the DC port can be controlled by the source. In this case, the PI controller that regulates the voltage $V_+$ in the neutral-leg controller shown in FIG. 5 can be removed.

TABLE I

Parameters of The Converter

| Parameters | Values |
|---|---|
| Grid voltage (RMS) | 120 V |
| Grid frequency $f$ | 60 Hz |
| Switching frequency $f_s$ | 20 kHz |
| Inductor $L_g$ | 2.2 mH |
| Inductor L | 2.2 mH |
| DC port voltage $V_+^*$ | 200 V |
| Rated storage voltage $V_{DC}^*$ | 500 V |
| Load R | 400 Ω |
| Capacitor $C_+$ | 90 μF |
| Capacitor C | 500 μF |
| Rated apparent power S | 300 VA |

Control of the Conversion Leg

The role of the conversion leg is to regulate the power exchanged with the grid through the disclosed invention. One particular feature to be noted is that the voltage reference $v_r$ generated by the power controller can only regulate the ac component in the duty cycle $d_1$ and $d_2$, which corresponds to $$\frac{v_g}{V_{DC}}$$

in (9). In order to ensure the proper operation of the converter, a bias needs to be added to generate the DC component $$\frac{V_+}{V_{DC}}$$

in the duty cycles $d_1$ and $d_2$. This can be achieved by designing the local inner-loop controller as the feedback through a virtual impedance $$R_v + \frac{1}{sC_v}.$$

Storage Voltage Controller

The controller shown in FIG. 2 is adopted, with the power of the DC port obtained as $P_L=V_+ I$.

Experimental Validation

The disclosed invention is validated with an experimental setup, of which the parameters are shown in Table I. The droop coefficients are set in such a way that 10% increase of the voltage E leads to 100% increase of real power P and 1% increase of the frequency leads to 100% decrease of reactive power Q. The amplifying coefficient $K_e$ is chosen as 10. The droop coefficients can be calculated as $$n = \frac{0.1 K_e E^*}{S} = \frac{0.1 * 10 * 120}{300} = 0.4$$

$$\text{and } m = \frac{0.01 \omega^*}{S} = \frac{0.01 * 2\pi * 60}{300} = 0.0126,$$

where S is the rated apparent power of the converter. The virtual RC impedance in the experiment is chosen as $$6 + \frac{30}{s} \Omega.$$

In the experiments, the reactive power reference was set as $Q_{set}=0$. The rated storage voltage was $V_{DC}^*=500$ V with $V_t=50$ V so the storage voltage is controlled within the range from 450 V to 550 V. In order to make sure that the converter can operate under the grid-support mode as long as possible, the storage capacitor C needs to be large enough, as 500 μF.

Figure 6:
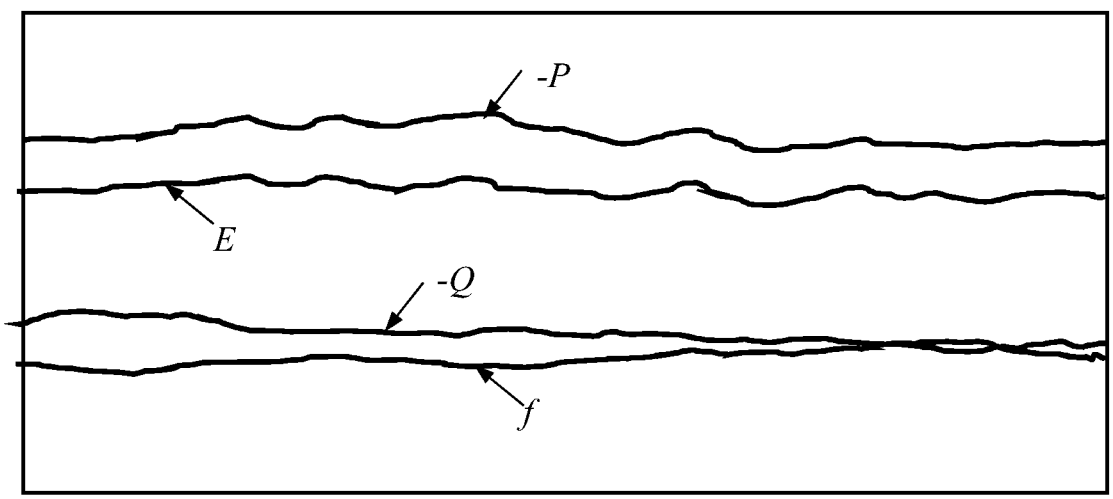
FIG. 6 shows the experimental results of the disclosed DC/AC converter to take part in the regulation of the grid frequency and the grid voltage.

The experimental results are shown in FIG. 6. It can be seen that the converter automatically changed its real power according to the grid voltage and its reactive power according to the grid frequency. In other words, it is able to provide the grid support without affecting the DC-port operation.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A DC/AC power electronic converter system, comprising
   a power electronic converter having a DC port, a storage port, and an AC port connected to a power source having a voltage and a current,
   a PWM block that generates pulses to operate the power electronic converter,
   a subtraction block that subtracts a first voltage signal from a second voltage signal to generate an input for the PWM block,
   an inner-loop controller that generates the first voltage signal according to the voltage and current of the power source,
   a power controller that generates the second voltage signal according to signals such as a real power set-point, a filtered storage voltage, a given rated storage voltage, and the voltage and current of the power source,
   a storage voltage controller that generates the real power set-point for the power controller according to a filtered storage voltage, a given rated storage voltage, and the DC-port power.

2. The converter system as claimed in claim 1 in which the storage voltage controller includes a unit that generates the real power set-point by adding the DC-port power to a scaled output of the unit that is generated according to an appropriate function of the filtered storage voltage and the given rated storage voltage.

3. The converter system as claimed in claim 2 in which the output of the unit is zero when the difference between the filtered storage voltage and the rated storage voltage falls into a given first range, and is one when it falls outside of a given second range.

4. The converter system as claimed in claim 3 in which the unit does not include hysteresis characteristics so that the first range coincides with the second range.

5. The converter system as claimed in claim 3 in which the unit includes hysteresis characteristics so that the first range does not coincide with the second range.

6. The converter system as claimed in claim 1 in which the inner-loop controller consists of a power source current feedback through a virtual impedance.

7. The converter system as claimed in claim 2 in which the filtered storage voltage is obtained by passing a measured storage voltage through a low-pass filter.

8. The converter system as claimed in claim 7 in which the low-pass filter is a hold filter.

* * * * *